United States Patent
Supalov

(10) Patent No.: US 8,725,875 B2
(45) Date of Patent: May 13, 2014

(54) NATIVE CLOUD COMPUTING VIA NETWORK SEGMENTATION

(75) Inventor: Alexander V. Supalov, Tuntenhausen (DE)

(73) Assignee: Intel Corporation, Santa Clara, CA (US)

( * ) Notice: Subject to any disclaimer, the term of this patent is extended or adjusted under 35 U.S.C. 154(b) by 269 days.

(21) Appl. No.: 13/165,533

(22) Filed: Jun. 21, 2011

(65) Prior Publication Data

US 2012/0331144 A1 Dec. 27, 2012

(51) Int. Cl.
*G06F 15/173* (2006.01)
*H04L 12/56* (2006.01)

(52) U.S. Cl.
CPC .............. *H04L 47/70* (2013.01); *H04L 47/72* (2013.01); *H04L 47/76* (2013.01); *H04L 47/781* (2013.01); *H04L 47/821* (2013.01)
USPC ........... 709/226; 709/201; 709/217; 709/220; 709/244; 709/249

(58) Field of Classification Search
USPC .................. 709/201, 217, 220, 226, 244, 249
See application file for complete search history.

(56) References Cited

U.S. PATENT DOCUMENTS

| | | | |
|---|---|---|---|
| 7,181,489 B2 * | 2/2007 | Lection et al. ................. | 709/202 |
| 7,287,180 B1 | 10/2007 | Chem et al. | |
| 7,403,993 B2 * | 7/2008 | John et al. ..................... | 709/226 |
| 8,069,251 B2 * | 11/2011 | Thornburgh et al. ......... | 709/227 |
| 8,281,007 B2 * | 10/2012 | Goto et al. .................... | 709/225 |
| 8,380,880 B2 * | 2/2013 | Gulley et al. ................. | 709/248 |
| 8,412,810 B1 * | 4/2013 | Tompkins ..................... | 709/223 |
| 2002/0169889 A1 * | 11/2002 | Yang et al. .................... | 709/244 |
| 2003/0093527 A1 | 5/2003 | Rolia | |
| 2006/0242453 A1 | 10/2006 | Kumar et al. | |
| 2008/0222267 A1 * | 9/2008 | Horn ............................. | 709/217 |
| 2011/0023104 A1 | 1/2011 | Franklin | |
| 2011/0161497 A1 * | 6/2011 | Childress et al. ............. | 709/226 |
| 2012/0303816 A1 * | 11/2012 | Kannan et al. ................ | 709/226 |
| 2012/0331147 A1 * | 12/2012 | Dutta et al. ................... | 709/226 |

OTHER PUBLICATIONS

International Search Report and Written Opinion mailed Dec. 21, 2012 for PCT Application No. PCT/US2012/039606, pp. 11.

* cited by examiner

*Primary Examiner* — Michael Y Won
(74) *Attorney, Agent, or Firm* — Schwabe, Williamson & Wyatt, P.C.

(57) ABSTRACT

Disclosed herein are systems, methods and storage medium associated with native cloud computing. In embodiments, a system may include a number of clusters of computing nodes, and a data communication network configured to couple the clusters of computing nodes. The system may further include a control node configured to segment or cause segmentation of the data communication network to isolate a cluster of the computing nodes from other clusters of the computing nodes, t for allocation for native execution of a computation task. The system may further include a control network coupled to the data communication network and the control node. Other embodiments may be disclosed and claimed.

22 Claims, 5 Drawing Sheets

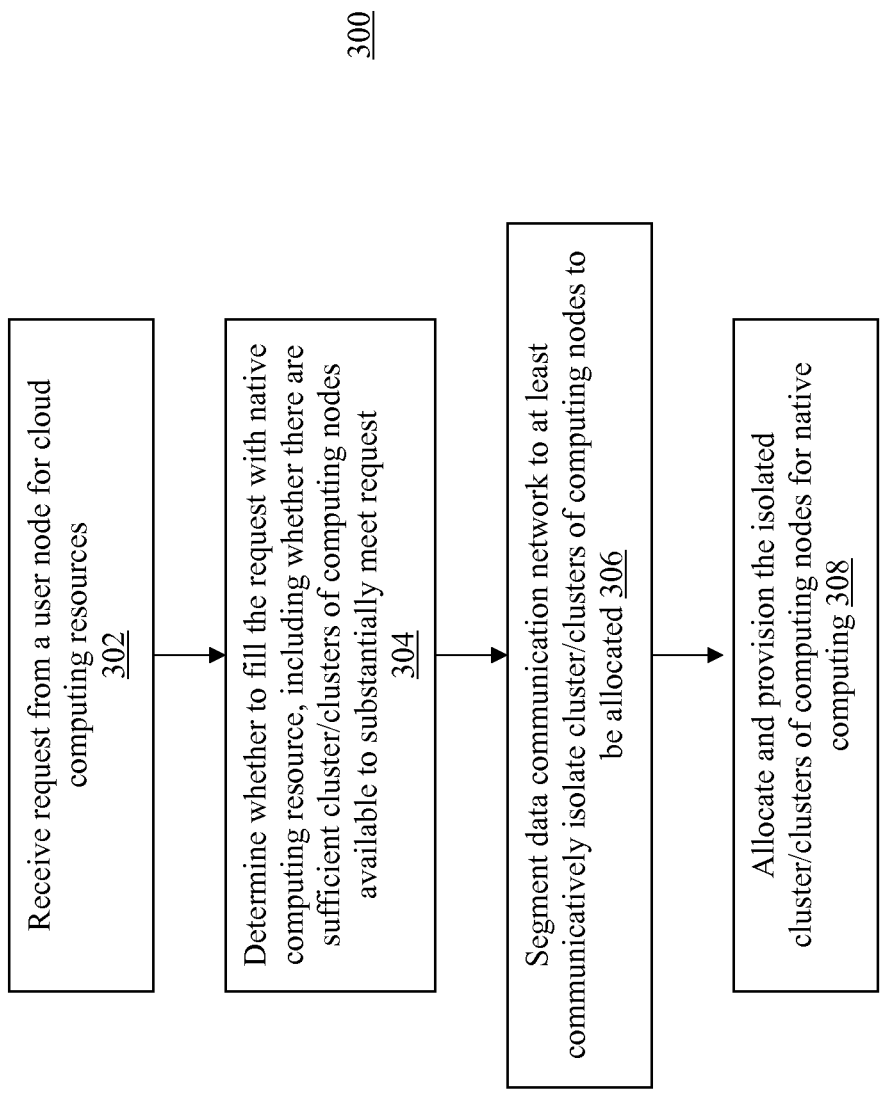

Non-transitory computer-readable storage medium
402

Programming Instructions 404

Configured to enable an apparatus, in response to execution of the programming instructions, to perform operations, including receiving from a user node, a request for cloud computing nodes to be allocated for execution of a computational task; determiningt a cluster of computing nodes is available for allocation and comprise computational resources substantially sufficient to meet the request, the cluster of computing nodes being coupled to other clusters of computing nodes via a data communication node; segmenting the data communication network to isolate the cluster of computing nodes to be allocated from the other clusters of the computing nodes; and allocating the isolated cluster of computing nodes for native execution of the computational task.

Figure 4

NATIVE CLOUD COMPUTING VIA NETWORK SEGMENTATION

TECHNICAL FIELD

Embodiments relate to the fields of data processing, in particular, to systems, methods and storage medium associated with native cloud computing.

BACKGROUND

Unless otherwise indicated herein, the materials described in this section are not prior art to the claims in this application and are not admitted to be prior art by inclusion in this section.

With advances in integrated circuit, computing and networking technologies, cloud computing has become popular. Recently, cloud computing has been employed for high performance computing, i.e., computational intensive applications, such as scientific computing. Currently, for security reasons, i.e., separating the different user applications, cloud computing typically instantiates and operates a number of virtual machines on each computing node respectively for the different user applications. As a result, performance may be 10-100 times slower than native computing.

BRIEF DESCRIPTION OF THE DRAWING

Embodiments of the present disclosure will be presented by way of exemplary embodiments, but not limitations, illustrated in the accompanying drawings in which like references denote similar elements, and in which:

FIG. 3 illustrates a method associated with native cloud computing;

FIG. 4 illustrate a non-transitory computer-storage medium configured to enable native cloud computing.

DETAILED DESCRIPTION

Figure 1:
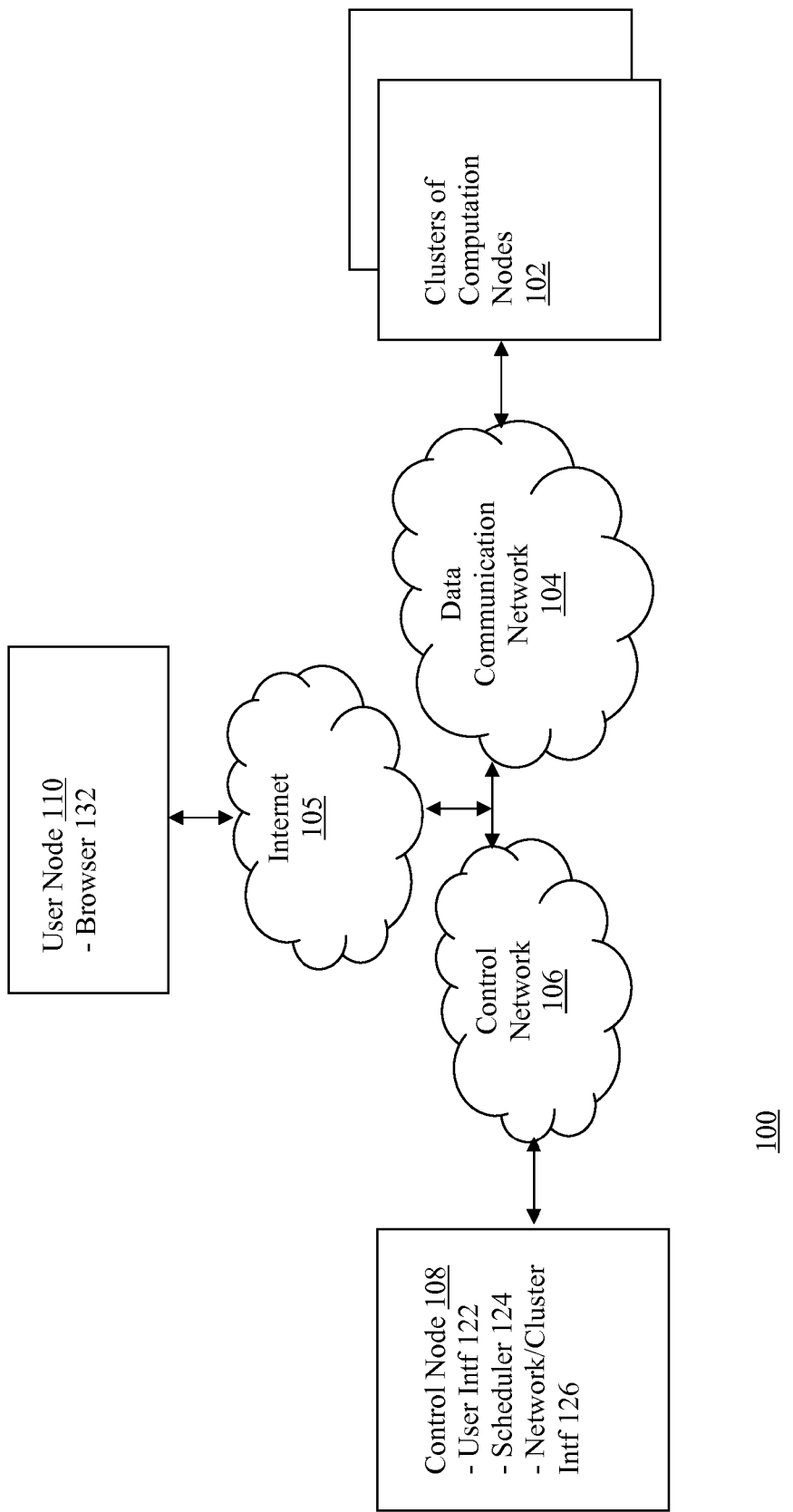
FIG. 1 illustrates an overview of a native cloud computing arrangement.

Embodiments of systems, methods and storage medium are associated with native cloud computing. In various embodiments, a system may include a number of clusters of computing nodes, and a data communication network configured to couple the clusters of computing nodes. The system may further include a control node configured to segment or cause segmentation of the data communication network to at least communicatively isolate a cluster of the computing nodes from other clusters of the computing nodes, for allocation for native execution of a computation task. The system may further include a control network coupled to the data communication network, and the control node.

In various embodiments, the control node may be configured to segment or cause segmentation of the data communication network to at least communicatively isolate the cluster of computing nodes to be allocated, in response to a request received from a user node, via the control network, for computing resources to execute the computation task, and the cluster of computer nodes is available for allocation and includes computational resources substantially sufficient to meet the request. The request may include a specification of a number of clusters and/or computing nodes, a specification of processor computing capacity, a specification of system memory capacity, a specification of persistent storage capacity, a specification input/output capacity, a specification of one or more operating systems, a specification of one or more programs associated with the computation task, a specification of one or more data sources or sinks associated with the computation task, and/or a specification of expected execution duration of the computation task.

In various embodiments, the control node may be further configured to provision or cause to be provisioned respective operating systems to computing nodes of the allocated cluster of computing nodes, load or cause to be loaded data associated with the computation task into the computing nodes to be provisioned, and/or launch or cause to be launched one or more programs associated with the computation task for native execution on the provisioned computing nodes. The control node may also be further configured to erase or cause to be erased all data associated with the computation task in the allocated cluster of computing nodes, after completion of the native execution of the computation task.

In various embodiments, the data communication network may be further configured to couple the clusters of computing nodes to Internet. The data communication network may comprise a first collection of networking devices, and the control network may comprise a second collection of networking devices, where the first and second collections of networking devices are different networking devices. In other embodiments, the data communication network may comprise a first collection of networking paths through a number of networking devices, and the control network may comprise a second collection of networking paths through at least some of the same networking devices, however, the first and second collection of networking paths are different networking paths or different protocols over the same networking paths.

In various embodiments, a method may include receiving, by a control node, from a user node, a request for cloud computing nodes to be allocated for execution of a computational task, and determining, by the control node, a cluster of computing nodes is available for allocation and includes computational resources substantially sufficient to meet the request. The cluster of computing nodes may be coupled to other clusters of computing nodes via a data communication network. The method may further include segmenting or causing segmentation of, by the control node, the data communication network to at least communicatively isolate the cluster of computing nodes from the other clusters of the computing nodes; and allocating, by the control node, the isolated cluster of computing nodes for native execution of the computational task.

In various embodiments, a non-transitory computer-readable storage medium may include programming instructions stored therein configured to program a server to perform the above described method, in response to execution of the programming instructions by the server.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The term "native execution" is used herein. The term, when used in the context of executing a task, refers to direct execution of the task on a computing node, as opposed to execution of the task in one of a number of virtual machines instantiated on the computing node. The terms "segment," "segmentation," and other variants are used herein. These terms, when used in the context of segmenting a data communication network coupling clusters of computing resources, refer to configuring the data communication network in a manner such that one or more clusters of computing nodes are at least communicatively isolated from other computing nodes, allowing the at least communicatively isolated cluster/clusters of computing nodes to be allocated for native execution of a task. In embodiments, in addition to being communicatively isolated, the isolated cluster/clusters of computing nodes may be physically isolated, i.e., separated, from the other cluster/clusters of computing nodes.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Referring now to FIG. 1, wherein an overview of a native cloud computing arrangement is illustrated. As shown, native cloud computing arrangement 100 may include various clusters of computing nodes 102 and data communication network 104 configured to couple the clusters of computing nodes 102 to each other and to Internet 105. Native cloud computing arrangement 100 may further include control network 106 coupled to data communication network 104, control node 108 and user node 110. User node 110 may be coupled to control network 106 and data communication network 104 via Internet 105. Control node 108 may be configured to segment data communication network 104 to at least communicatively isolate a cluster of computing nodes 102 for allocation for native execution of a task, in response to a request from user node 110 for cloud computing resources for execution of the task, to be described in more detail below.

Each computing nodes of the various clusters of computing nodes 102 may have one or several CPUs, local random-access memory, and input/output (I/O) facilities like hard disk drive, etc. Computing nodes may be any computing systems known in the art, e.g., computing servers available from Dell Computer of Austin, Tex., or Hewlett Packard of Palo Alto. In various embodiments, a computing server may comprise of blade servers. A blade server may comprise of multi-core processors, e.g., multi-core processors from Intel Corporation of Santa Clara, Calif. A blade server may also include system memory, mass storage, and/or one or more networking cards/interfaces of various types. An example of a computing node 102 will be described in further detail later, with references to FIG. 5. The number of computing nodes 102, the computing capacity of the computing nodes, and the networking types employed may vary from implementation to implementation, depending on the number of computational intensive tasks to be supported concurrently, the computational intensities, and the data communication characteristics of these tasks.

Data communication network 104 may be any high speed network or networks configured to facilitate data communication between the clusters of computing nodes 102, e.g., 10G Ethernet or InfiniBand. Data communication network 104, except of the teachings of the present disclosure, may comprise any high speed networking devices, such as high speed routers, switches and/or gateways, known in the art, e.g., high speed routers, switches and gateways available from Cisco Systems, Inc., San Jose, Calif., Mellanox, San Jose, Calif., or Netgear, Inc., San Jose, Calif. Data communication network 104 may be wired, wireless or both. In various embodiments, the routers, switches and/or gateways of data communication network 104 may be arranged in a manner so that data communication network 104 may be segmented to selectively isolate computing nodes, at least communication-wise, into collections of different sizes.

Figure 2:
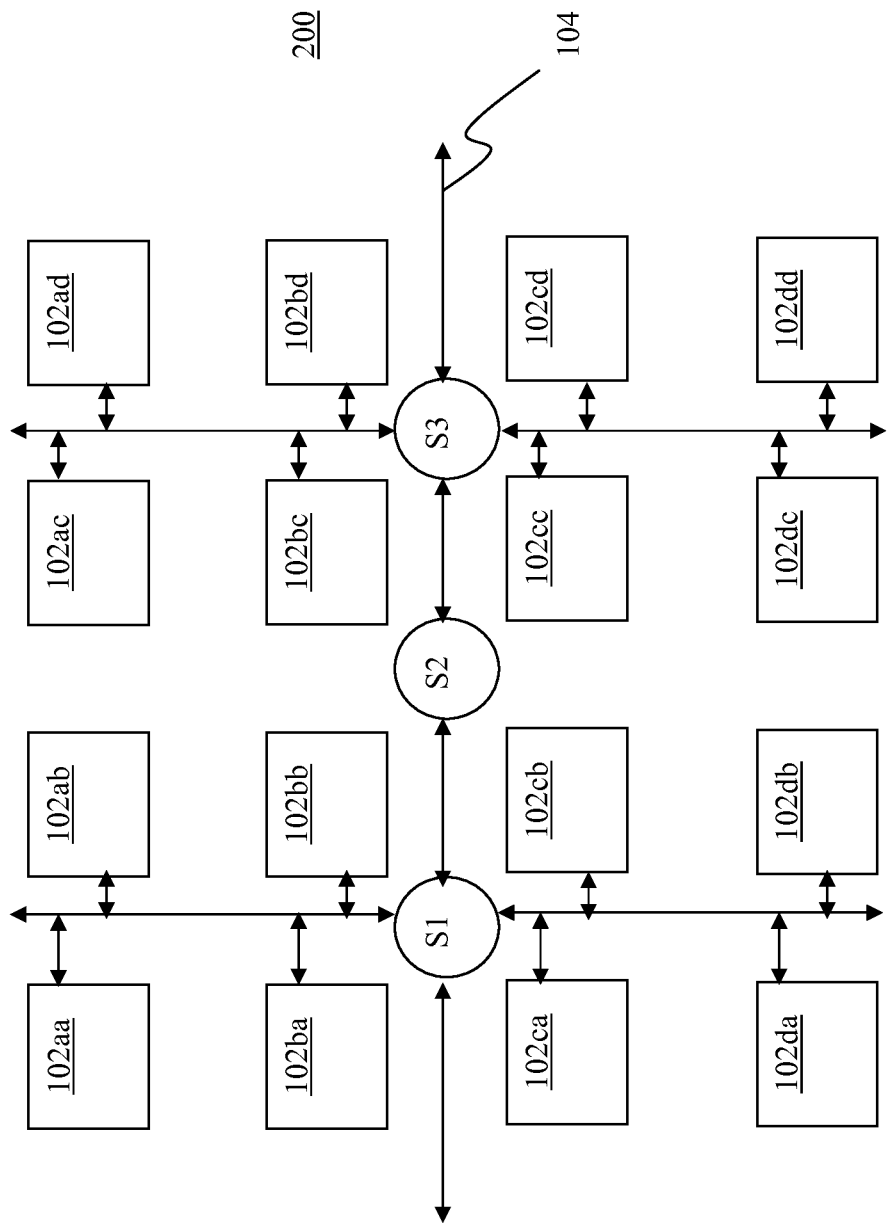
FIG. 2 illustrates an example segmentation of a data communication network to form native computing clouds.

Referring now also to FIG. 2, wherein various embodiments with 16 clusters of computing nodes 102*aa*-102*dd* are illustrated. For the embodiments, the routers et al. of data communication network 104 may be arranged in a manner such that the 16 clusters of computing nodes 102*aa*-102*dd*, may be segmented into 2 collections of 8 clusters of computing nodes, by e.g., "blocking" data traffic at switching point S2 (described in more detail below). The first collection of 8 clusters of computing nodes includes clusters of computing nodes 102*aa*-102*ab*, 102*ba*-102*bb*, 102*ca*-102*cb* and 102*da* and 102*db*, whereas the second collection of 8 clusters of computing nodes includes computing nodes 102*ac*-102*ad*, 102*bc*-102*bd*, 102*cc*-102*cd* and 102*dc* and 102*dd*. Each of these collections of clusters of computing nodes is at least communicatively isolated and secured from the other collection of clusters computing nodes.

Still referring to FIG. 2, the second collection of 8 clusters of computing nodes, may be further segmented into 2 smaller collections of 4 clusters computing nodes, by e.g., "blocking" data traffic at switching point S3. The first of these two new collections of 4 clusters of computing nodes includes clusters of computing nodes 102*ac*-102*ad*, 102*bc*-102*bd*, whereas the second new collection of 4 clusters of computing nodes includes clusters of computing nodes 102*cc*-102*cd* and 102*dc* and 102*dd*. Similarly, each of these new collections of clusters of computing nodes is at least communicatively isolated and secured from the other collections of clusters of computing nodes.

The foregoing example is intended to be illustrative and not to be read as limiting on the present disclosure. Other number of clusters of computing nodes 102, and other segmenting arrangements may be practiced, without limitation. In particular, it is anticipated that in embodiments, data communication network 104 may be segmented to at least communicatively isolate a cluster of computing nodes 102 from other clusters of computing nodes. Further, the isolated cluster/clusters of computing nodes 102 may remain coupled to the Internet, and the other cluster/clusters of computing nodes 102 may remain available for allocation to service other cloud computing requests.

Referring back to FIG. 1, as described earlier, native cloud computing arrangement 100 may include control network 106. Unlike data communication network 104, control network 106 may be a limited bandwidth network or networks. Control network 106, except of the teachings of the present disclosure, may comprise any low to mid-range performance networking devices, such as low to mid-range performance routers, switches and/or gateways, known in the art, e.g., low to mid-range routers, switches and gateways available from Cisco Systems, Inc., of San Jose, Calif., or Netgear, Inc., of San Jose, Calif. Control network 106 may likewise be wired, wireless or both.

In various embodiments, data communication network 104 and control network 106 may comprise respectively different groups of networking devices. In some embodiments, at least part of data communication network 104 and control network 106 may comprise respectively different separated groups of networking paths routed over common networking devices, or different protocols over same common networking paths.

As described earlier native cloud computing arrangement 100 may include control node 108. Control node 108 may include control logic/elements configured to perform the control functions described herein. In various embodiments, the control logic/elements may include user interface 122 configured to receive from user node 110 a request for cloud computing resources for executing a computational task, and scheduler 124 operatively coupled to the user interface 122 and configured to determine whether one or more clusters of computing nodes 102 are available and include sufficient computing resource to substantially meet the request for allocation for native execution of the computational task. Scheduler 124 may be further configured to allocate the cluster/clusters 102 on determination of their availability and having sufficient resources. The control logic/elements may further include network/cluster interface 126 operatively coupled to scheduler 122 and configured to segment data communication network 104 to isolate the allocated cluster/clusters 102. User interface 122, scheduler 124 and network/cluster interface 126 may be implemented in hardware, software, or a combination of both. In various embodiments, user interface 122, scheduler 124 and/or network/cluster interface 126 may be combined, e.g., together forming a controller.

Likewise, as described earlier, native cloud computing arrangement 100 may include user node 110. User node 110 may include browser 132 configured to enable user node 110 to submit a request for cloud computing resources for executing a computational task, e.g. by accessing a webpage (not shown) provided by control node 108. Browser 132 may be further configured to enable user node 110 to receive in response a notice of an allocation of cluster/clusters of computation nodes 102, wherein the allocated cluster/clusters of computation nodes 102 are isolated from other cluster/clusters of computation nodes 102 by virtue of data communication network 104 having been segmented. In alternate embodiments, browser 132 may be provided with a plug-in (not shown) to browser 132 configured to enable user node 110 to submit the request and/or receive the allocation notice. In still other embodiments, in lieu of browser 132, user node 110 may be provided with an agent (not shown) of control node 108 configured to provide similar functionalities.

Similar to computing nodes of clusters 102, except of the teachings of the present disclosure incorporated therein, control node 108 and/or user node 110 may be any computing systems known in the art, e.g., desktop, laptop or tablet computers available from Dell Computer of Austin, Tex., or Hewlett Packard of Palo Alto. In various embodiments, a computing server may comprise of blade servers. Control node 108 and/or user node 110 may comprise of multi-core processors, e.g., multi-core processors from Intel Corporation of Santa Clara, Calif. Control node 108 and/or user node 110 may also include system memory, mass storage and/or one or more networking cards/interfaces of various types. Control node 108 and user node 110 may be similar or dissimilar computing devices. In various embodiments, control node 108 and user node 110 may be the same computing device. Further, control node 108 or user node 110 may be one of the computing nodes of clusters 102, or both are also computing nodes of clusters 102. An example of a control node 108 and/or user node 110 will also be described in further detail later, with references to FIG. 5.

FIG. 3 illustrates a method associated with native cloud computing, in accordance with various embodiments. As shown, method 300 may start at block 302 with control node 108 receiving a request from a user node 110 for cloud computing resources. In various embodiments, the request may include a specification of a number of clusters and/or computing nodes, a specification of processor computing capacity, a specification of system memory capacity, a specification of persistent storage capacity, a specification input/output capacity, a specification of one or more operating systems, a specification of one or more programs associated with the computation task, a specification of one or more data sources or sinks associated with the computation task, and/or a specification of expected execution duration of the computation task. In various embodiments, the request may explicitly request native computing nodes.

From block 302, method 300 may proceed to block 304, wherein control node 108 may determine whether to fill the request with native computing resource, including whether there are sufficient native computing resources available to substantially meet the request. In various embodiments, control node 108 may be configured to fill the request with native computing nodes, if the request explicitly requests them. In various embodiments, control node 108 may be configured to fill the request with native computing nodes, if the request requests for processor computing capacity in excess of a threshold. In various embodiments, control node 108 may be configured to fill a request with a native computing cloud with computing resources/capacities that substantially meet the request, as opposed to precisely or exceedingly meeting the request.

From block 304, on determining to fill a request with native computing resource and that there are sufficient native computing resources available to substantially fill the request, method 300 may proceed to block 306, wherein control node 108 may segment or cause to be segmented data communication network 104 to at least communicatively isolate one or more clusters of computing nodes to be allocated for native execution of the user's task(s). Control node 108 may segment or cause to be segmented data communication network 104 by directly configuring or causing configuration of the routing, connections and/or protocols of the networking elements of data communication network 104 to block data communications between the isolated cluster or clusters of computing nodes with the other clusters of computing nodes. Control node 108 may cause configuration e.g., by issuing instructions to operators to configure the networking elements, routers, switches, cables and so forth. The instructions may include privileged and/or user inaccessible commands for the networking elements. The instructions may include instructions to the operators to physically decouple certain networking elements, resulting in one or more clusters of computing nodes being physically isolated from the other clusters of computing nodes.

From block 306, on segmenting data communication network 104 to at least communicatively isolate the cluster or clusters of computing nodes for allocation, method 300 may proceed to block 308, wherein control node 108 may allocate the isolated cluster or clusters of computing nodes 102 to the request, provision or cause to be provisioned default or specified operating systems to the computing nodes of the allocated cluster/clusters of computing nodes. In various embodiments, control node 108 may further load and launch, or cause to be loaded/launched the associated applications for native execution on the provisioned cluster/clusters of computing nodes. In various embodiments, control node 108 may further copy or cause to copied application data into the provisioned cluster/clusters of computing nodes. In various embodiments, control node 108 may cause the provisioning, loading/launching and/or copying by issuing instructions to user node 110 or the allocated cluster/clusters of computing nodes to perform the provisioning, loading/launching and/or copying by issuing instructions to the allocated cluster/clusters of computing nodes to perform the provisioning, loading/launching and/or copying. User node 110 may perform the provisioning, loading/launching and/or copying, responsive to inputs from a user of user node 110. As described earlier, the allocated cluster/clusters of computing nodes is/are isolated and secured from other clusters of computing nodes, by virtue of at least the segmentation of data communication segment. Thus, the user task(s) may be executed securely and natively on the allocated cluster/clusters of computing nodes, and potentially gaining 10-100× in execution performance compared to the classical cloud arrangements that use virtual machines (VM) to achieve a comparable level of security. Accordingly, the native cloud computing method and apparatus of the present disclosure may be particularly suitable for high performance computing, i.e., computational intensive applications, such as scientific computing. In various embodiments, the method may further include control node 108 erasing or causing to be erased data associated with the computing task from the allocated cluster/clusters of computing nodes 102. Erasure may include overwriting random access memory, caches, and any I/O facilities of the allocated cluster/clusters of computing nodes that were used, e.g., user specific area on the local and shared hard disk drives of the allocated cluster/clusters of computing nodes. Further, data associated with the task residing on shared resources of the allocated cluster/clusters of computing nodes may be optionally backed up, irretrievably removed, and made available for retrieval again only at a subsequent specific user's request. In embodiments, the associated data, including execution result, may be made retrievable through the Internet.

FIG. 4 illustrates a non-transitory computer-readable storage medium, in accordance with various embodiments of the present disclosure. As illustrated, non-transitory computer-readable storage medium 402 may include a number of programming instructions 404. Programming instructions 404 may be configured to enable an apparatus, in response to execution of the programming instructions, to perform operations, including:

receiving from a user node, a request for cloud computing nodes to be allocated for execution of a computational task;

determining a cluster of computing nodes is available for allocation and comprise computational resources sufficient to substantially meet the request, the cluster of computing nodes being coupled to other clusters of computing nodes via a data communication network;

segmenting or causing to be segmented the data communication network to isolate the cluster of computing nodes from other clusters of the computing nodes; and allocating the isolated clustser of computing nodes for native execution of the computational task.

Figure 5:
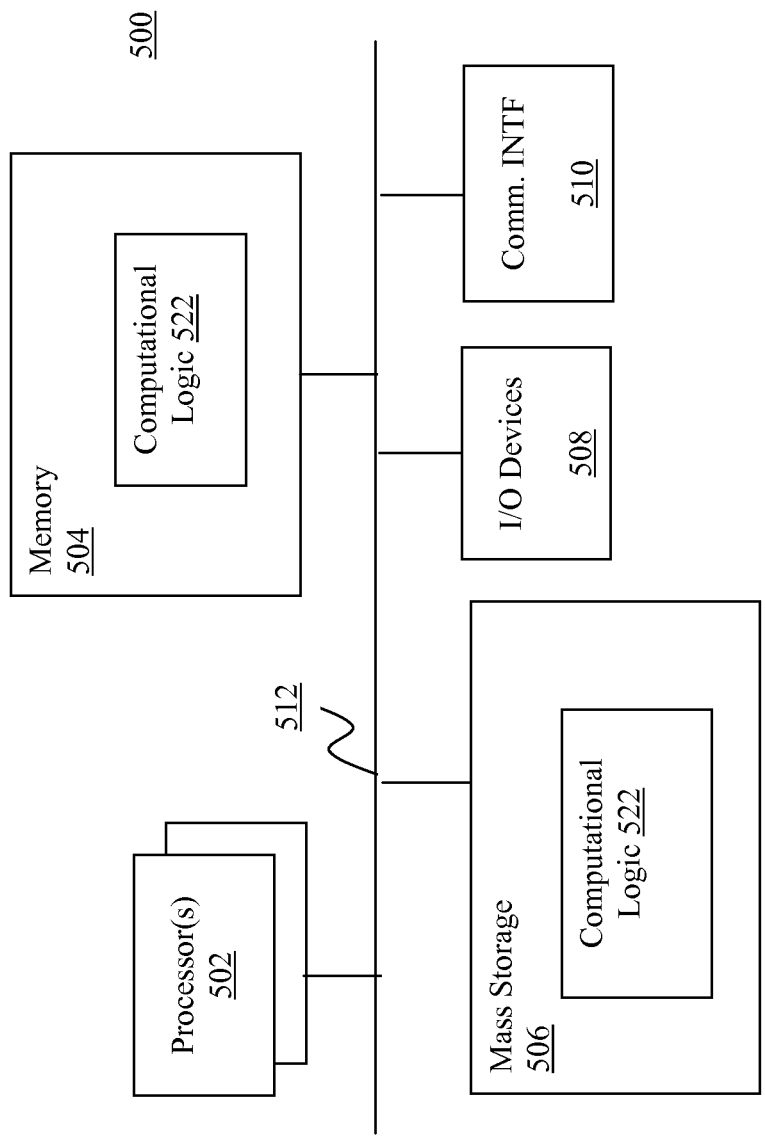
FIG. 5 illustrates an example computer system suitable for use as a computing node or the control node of a native cloud computing arrangement, where all of the foregoing illustrations are arranged in accordance with embodiments of the present disclosure.

FIG. 5 illustrates an example computer system suitable for use as a computing node or the control node in accordance with various embodiments of the present disclosure. As shown, computing system 500 includes a number of processors or processor cores 502, and system memory 504. For the purpose of this application, including the claims, the terms "processor" and "processor cores" may be considered synonymous, unless the context clearly requires otherwise. Additionally, computing system 500 includes mass storage devices 506 (such as diskette, hard drive, compact disc read only memory (CDROM) and so forth), input/output devices 508 (such as display, keyboard, cursor control and so forth) and communication interfaces 510 (such as network interface cards, modems and so forth). The elements are coupled to each other via system bus 512, which represents one or more buses. In the case of multiple buses, they are bridged by one or more bus bridges (not shown).

Each of these elements performs its conventional functions known in the art. In particular, system memory 504 and mass storage 506 may be employed to store a working copy and a permanent copy of the programming instructions implementing the method of FIG. 3, or portions thereof, herein collectively denoted as, computational logic 522. The various components may be implemented by assembler instructions supported by processor(s) 502 or high-level languages, such as, for example, C, that can be compiled into such instructions.

The permanent copy of the programming instructions may be placed into permanent storage 506 in the factory, or in the field, through, for example, a distribution medium (not shown), such as a compact disc (CD), or through communication interface 710 (from a distribution server (not shown)). That is, one or more distribution media having an implementation of the agent program may be employed to distribute the agent and program various computing devices.

The constitution of these elements 502-512 are known, and accordingly will not be further described.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present invention. This application is intended to cover any adaptations or variations of the embodiments discussed herein. Therefore, it is manifestly intended that the embodiments of the present invention be limited only by the claims and the equivalents thereof.

What is claimed is:

1. A system, comprising:
    a plurality of clusters of computing nodes;
    a data communication network configured to couple the clusters of computing nodes; and
    a control node coupled to the data communication network and configured to:
        segment the data communication network, or cause the data communication network to be segmented, to communicatively or physically isolate a cluster of computing nodes from other clusters of computing nodes for allocation for native execution of a computation task requested from a user node, and
        provision or cause to be provisioned respective operating systems to computing nodes of the allocated cluster of computing nodes, to load or cause to be loaded data associated with the computation task into the computing nodes to be provisioned, or launch or caused to be launched one or more programs associated with the computation task for native execution on the provisioned computing nodes.

2. The system of claim 1, further comprising a control network coupled with the data communication network and the control node, wherein the control node is configured to segment the data communication network, or cause the data communication network to be segmented, to communicatively or physically isolate the cluster of computing nodes to be allocated, via the control network, in response to a request received from the user node, for computing resources to execute the computation task, and the cluster of computing nodes is available for allocation and comprises computational resources substantially sufficient to meet the request.

3. The system of claim 2, wherein the request comprises a specification of a number of clusters or computing nodes, a specification of processor computing capacity, a specification of system memory capacity, a specification of persistent storage capacity, a specification of input/output capacity, a specification of one or more operating systems, a specification of one or more programs associated with the computation task, a specification of one or more data sources or sinks associated with the computation task, and/or a specification of expected execution duration of the computation task.

4. The system of claim 1, wherein the control node is further configured to erase or cause to be erased all data associated with the computation task in the allocated cluster of computing nodes, after completion of the native execution of the computation task.

5. The system of claim 1, wherein the data communication network is further configured to couple the clusters of computing nodes to Internet.

6. The system of claim 2, wherein the data communication network comprises a first plurality of networking devices, and the control network comprises a second plurality of networking devices, and wherein the first and second plurality of networking devices comprise at least some different networking devices.

7. The system of claim 2, wherein the data communication network comprises a first plurality of networking paths through a plurality of networking devices, and the control network comprises a second plurality of networking paths through the plurality of networking devices, and wherein the first and second plurality of networking paths are different networking paths or different protocols over same networking paths.

8. A method, comprising:
receiving, by a control node, from a user node, a request for cloud computing nodes to be allocated for execution of a computation task;
determining, by the control node, at least a cluster of cloud computing nodes is available for allocation and comprise computational resources sufficient to substantially meet the request, the cluster of cloud computing nodes being coupled to other clusters of cloud computing nodes via a data communication network;
segmenting or causing segmentation of, by the control node, the data communication network to communicatively or physically isolate the cluster of cloud computing nodes from other clusters of cloud computing nodes;
allocating, by the control node, the isolated cluster of cloud computing nodes for native execution of the computation task; and
by the control node, provisioning or causing to be provisioned respective operating systems to cloud computing nodes of the allocated cluster of cloud computing nodes, loading or causing to be loaded data associated with the computation task into the cloud computing nodes to be provisioned, or launching or causing to be launched one or more programs associated with the computation task for native execution on the provisioned cloud computing nodes.

9. The method of claim 8, wherein receiving a request comprises receiving the request via a control network, and wherein segmenting the data communication network comprises segmenting the data communication network via the control network.

10. The method of claim 8, wherein receiving a request comprises receiving a request having a specification of a number of clusters or cloud computing nodes, a specification of processor computing capacity, a specification of system memory capacity, a specification of persistent storage capacity, a specification of input/output capacity, a specification of one or more operating systems, a specification of one or more programs associated with the computation task, or a specification of one or more data sources or sinks associated with the computation task, and/or a specification of expected execution duration of the computation task.

11. The method of claim 8, wherein segmenting comprises configuring, via the control network, one or more networking devices of the data communication network, one or more paths through one or more networking devices of the data communication network, or one or more protocols over one or more paths through one or more networking devices of the data communication network.

12. The method of claim 8, further comprising the control node erasing or causing to be erased all data associated with the computation task in the allocated cluster of cloud computing nodes, after completion of the native execution of the computation task.

13. A computer-readable non-transitory storage medium, comprising a plurality of programming instructions stored in the storage medium configured to cause an apparatus, in response to execution of the programming instructions by the apparatus, to:
receive, from a user node, a request for cloud computing nodes to be allocated for execution of a computation task;
determine at least a cluster of cloud computing nodes is available for allocation and comprises computational resources sufficient to substantially meet the request, the cluster of cloud computing nodes being coupled to other clusters of cloud computing nodes via a data communication network;
segment or cause to be segmented the data communication network to communicatively or physically isolate the cluster of cloud computing nodes from other clusters of cloud computing nodes;
allocate the isolated cluster of cloud computing nodes for native execution of the computation task; and
provision or cause to be provisioned the allocated cloud computing nodes with respective operating systems, load or cause to be loaded data associated with the computation task into the allocated cloud computing nodes, or launch or cause to be launched one or more programs associated with the computation task for native execution on the allocated cloud computing nodes.

14. The storage medium of claim 13, wherein receive a request comprises receive the request via a control network, and wherein segment the data communication network comprises segment the data communication network via the control network.

15. The storage medium of claim 13, wherein receive a request comprises receive a request having a specification of a number of clusters or cloud computing nodes, a specification of processor computing capacity, a specification of system memory capacity, a specification of persistent storage capacity, a specification of input/output capacity, a specification of one or more operating systems, a specification of one or more programs associated with the computation task, a specification of one or more data sources or sinks associated with the computation task, and/or a specification of expected execution duration of the computation task.

16. The storage medium of claim 13, wherein segment or cause to be segmented the data communication network comprises configure, via the control network, one or more networking devices of the data communication network, one or more paths through one or more networking devices of the data communication network, or one or more protocols over one or more paths through one or more networking devices of the data communication network.

17. The storage medium of claim 13, wherein the plurality of programming instructions stored in the storage medium are further configured to cause an apparatus, in response to execution of the programming instructions by the apparatus, to erase or cause to be erased all data associated with the computation task in the allocated cluster of cloud computing nodes, after completion of the native execution the computation task.

18. An apparatus comprising:
a processor;
a user interface operated by the processor and configured to receive, from a user node, a request for cloud computing resources to be allocated for execution of a computation task;
a scheduler operatively coupled to the user interface and configured to:
determine whether a cluster of computing nodes is available for allocation and comprises computational resources sufficient to substantially meet the request, and to allocate the cluster of computing nodes for native execution of the computation task on determination that the cluster of computing nodes comprises computational resources sufficient to substantially meet the request and available for allocation, wherein the cluster of computing nodes is coupled to other clusters of computing nodes via a data communication network, and
provision or cause to be provisioned respective operating systems to computing nodes of the allocated cluster of computing nodes, load or cause to be loaded data associated with the computation task into the computing nodes to be provisioned, or launch or cause to be launched one or more programs associated with the computation task for native execution on the provisioned computing nodes; and
a network/cluster interface operatively coupled to the schedule and configured to segment or cause to be segmented the data communication network to communicatively or physically isolate the cluster of computing nodes from other clusters of computing nodes, on allocation of the cluster of computing nodes for native execution of the computation task.

19. The apparatus of claim 18, wherein the request comprises a specification of processor computing capacity, a specification of system memory capacity, a specification of persistent storage capacity, a specification input/output capacity, a specification of one or more operating systems, a specification of one or more programs associated with the computation task, and/or a specification of one or more data sources or sinks associated with the computation task.

20. The apparatus of claim 18, wherein the scheduler is configured to segment one or more paths through one or more networking devices of the data communication network, or one or more protocols over one or more paths through one or more networking devices of the data communication network, to segment the data communication network.

21. The apparatus of claim 18, wherein the scheduler is further configured to erase or cause to be erased all data associated with the computation task in the allocated cluster of computing nodes, after completion of the native execution of the computation task.

22. A non-transitory computer-readable storage medium having instructions stored therein which, when executed on a user computing node, cause the user computing node to:
submit a request, to a control node, for cloud computing resources for execution of a computation task, wherein the request includes a specification of a number of clusters or computing nodes, a specification of processor computing capacity, a specification of system memory capacity, a specification of persistent storage capacity, a specification of input/output capacity, a specification of one or more operating systems, a specification of one or more programs associated with the computation task, or a specification of one or more data sources or sinks associated with the computation task, and/or a specification of expected execution duration of the computation task;
receive, from the control node, a notice of an allocation of a cluster of computing nodes for native execution of the computation task, wherein the cluster of computing nodes is communicatively or physically isolated from other clusters of computing nodes by virtue of a data communication network coupling the clusters of computing nodes having been segmented; and
provision the allocated cluster of computing nodes with respective operating systems, load data associated with the computation task into the provisioned computing nodes, or launch one or more programs associated with the computation task for native execution on the computing nodes, responsive to inputs from a user of the user computing node.

* * * * *